US012722542B2

(12) United States Patent
Kim et al.

(10) Patent No.: US 12,722,542 B2
(45) Date of Patent: Sep. 1, 2026

(54) BRAKE DEVICE OF RECLINER FOR VEHICLE SEAT

(71) Applicant: Hyundai Transys Inc., Seosan-si (KR)

(72) Inventors: Won Kim, Hwaseong-si (KR); Jin Wook Choi, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 416 days.

(21) Appl. No.: 18/493,023

(22) Filed: Oct. 24, 2023

(65) Prior Publication Data

US 2024/0140276 A1 May 2, 2024

(30) Foreign Application Priority Data

Nov. 1, 2022 (KR) ........................ 10-2022-0143721

(51) Int. Cl.
*F16D 63/00* (2006.01)
*B60N 2/22* (2006.01)

(52) U.S. Cl.
CPC .................................. *B60N 2/2227* (2013.01)

(58) Field of Classification Search
CPC . B60N 2/12; B60N 2/168; B60N 2/20; B60N 2/22; B60N 2/2227; F16D 63/006
See application file for complete search history.

(56) References Cited

U.S. PATENT DOCUMENTS

| | | | | |
|---|---|---|---|---|
| 7,611,204 B2 * | 11/2009 | Reed | B60N 2/2218 | 192/66.1 |
| 8,678,154 B2 * | 3/2014 | Kim | B60N 2/167 | 192/223.2 |
| 12,459,406 B2 * | 11/2025 | Kim | B60N 2/168 | |
| 2008/0001457 A1 * | 1/2008 | Reed | B60N 2/06 | 297/361.1 |
| 2011/0266851 A1 * | 11/2011 | Kim | B60N 2/167 | 297/344.12 |
| 2024/0157857 A1 * | 5/2024 | Kim | B60N 2/22 | |
| 2024/0416804 A1 * | 12/2024 | Kim | B60N 2/168 | |

FOREIGN PATENT DOCUMENTS

| | | |
|---|---|---|
| DE | 4317150 C1 | 10/1994 |
| DE | 19616680 A1 | 11/1997 |
| DE | 102008028086 A1 | 12/2009 |
| JP | H07-042344 Y2 | 10/1995 |
| KR | 10-0812232 B1 | 3/2008 |
| KR | 10-1702780 B1 | 2/2017 |
| KR | 10-2071474 B1 | 1/2020 |

OTHER PUBLICATIONS

Simon Jazbec, "Extended European Search Report for EP Application No. 23205703.4", Mar. 25, 2024, EPO, Germany.

* cited by examiner

*Primary Examiner* — Thomas W Irvin
(74) *Attorney, Agent, or Firm* — Bridgeway IP Law Group, PLLC; Jihun Kim

(57) ABSTRACT

A brake device of a recliner for a vehicle seat includes: a housing having a through-hole through which a shaft of a seat recliner passes; a fixture provided in an accommodation space of the housing to be coupled to the shaft, having a protrusion portion formed on the outer side thereof, and configured to be prevented from rotating by engagement of the protrusion portion and the key portion while being supported upwards; and a release lever installed above the fixture and configured to press, if a rotational force is applied from the outside, the fixture downwards so as to release the engagement of the protrusion portion and the key portion.

13 Claims, 9 Drawing Sheets

BRAKE DEVICE OF RECLINER FOR VEHICLE SEAT

CROSS-REFERENCE TO RELATED APPLICATION(S)

This application is based on and claims priority under 35 U.S.C. 119 to Korean Patent Application No. 10-2022-0143721, filed on Nov. 1, 2022, in the Korean Intellectual Property Office, the disclosure of which is herein incorporated by reference in its entirety.

TECHNICAL FIELD

The present disclosure relates to a brake device of a recliner for a vehicle seat and, more specifically, to a brake device of a recliner for a vehicle seat, which enables rotation of the recliner when a forward input of rotational force is applied to a release lever and prevents the rotation of the recliner when a rotational force is applied to a shaft in the state in which the vehicle seat is fixed.

BACKGROUND

In general, the seat of a vehicle includes a seat cushion installed on the interior floor to support the load of an occupant and move forward and backward, thereby supporting the lower body of the occupant, and a seatback installed rotatable at a certain angle with respect to the seat cushion, thereby supporting the upper body of the occupant.

This seat is equipped with a sliding device that allows the driver or passenger to adjust the front and rear position of the seat by pulling or pushing the seat cushion forward and backward to conform to their body shape and a recliner for variably adjusting the inclination angle of the seatback with respect to the seat cushion to obtain the most comfortable posture when sitting on the seat.

In particular, the recliner has a problem in which the inclination angle of the seatback changes due to repetitive load transmitted to the seatback by the occupant in the state where the inclination angle of the seatback is adjusted with respect to the seat cushion, and thus, in order to solve this problem, a recliner having a brake unit including a brake drum separately mounted to the outside of the recliner is introduced.

However, in the conventional recliner equipped with an external brake unit described above, the braking force of the recliner is generated through friction between metal materials. This is based on the principle that when the user applies rotational force from the outside, the friction force is released to enable reclining of the seat, and that when a reverse input of external force is applied from the seatback due to vibration or road impact while driving the vehicle, a braking force is generated to prevent the reclining of the seat.

Such a brake device of the recliner generates braking force by friction between metals so that the number of parts may increase to generate the braking force or may cause operational problems (i.e. noise, vibration, harshness) depending on the product.

Accordingly, there is a need for a method to generate breaking force through engagement and release, instead of generating braking force by friction, in the brake device of a recliner, thereby improving breaking force, compared to the prior art, and attaining the same performance with a minimum number of parts.

The foregoing described as the background art is intended merely to aid in the understanding of the background of the present disclosure, and is not intended to mean that the present disclosure falls within the purview of the related art already known to those skilled in the art.

SUMMARY

The present disclosure is to provide a brake device of a recliner for a vehicle seat, which is configured to enable the rotation of the recliner when a forward input of rotational force is applied to a release lever and prevent the rotation of the recliner when a rotational force is applied to a shaft in the state in which the vehicle seat is fixed, thereby improving operational stability.

The technical subjects pursued in the present disclosure may not be limited to the above-mentioned technical subjects, and other technical subjects which are not mentioned may be clearly understood, through the following descriptions, by those skilled in the art to which the present disclosure pertains.

In accordance with an aspect of the present disclosure, there is provided a brake device of a recliner for a vehicle seat, which may include: a housing having a through-hole through which a shaft of a seat recliner passes, an accommodation space formed therein, and a key portion formed toward the inside thereof; a fixture provided in the accommodation space of the housing to be coupled to the shaft, supported upwards by a spring, having a protrusion portion formed on the outer side thereof, and configured to be prevented from rotating by engagement of the protrusion portion and the key portion while being supported upwards; and a release lever installed above the fixture and configured to press, if a rotational force is applied from the outside, the fixture downwards so as to release the engagement of the protrusion portion and the key portion, thereby enabling rotation of the shaft and the fixture.

For example, a plurality of key portions may protrude inwards from the inner circumferential surface of the housing and may be formed to be spaced apart from each other in the circumferential direction thereof.

For example, a pressing portion may extend downwards from the release lever, and if the release lever rotates, the pressing portion may press the fixture downwards to move the fixture downwards.

For example, a side end of the pressing portion may come into contact with the fixture, and an inclined portion may be formed on the side end of the pressing portion so as to become narrower in width from top to bottom, and the fixture may be pressed by the inclined portion of the pressing portion to move downwards.

For example, an inclined hole may be formed in the fixture, and the pressing portion may be inserted into the inclined hole, and if the release lever rotates in the state in which the pressing portion is inserted into the inclined hole, the inclined portion of the pressing portion may press the side end of the inclined hole to move the fixture downwards.

For example, the pressing portion may press the fixture downwards such that the protrusion portion may be released downwards from the key portion, thereby enabling rotation of the fixture and shaft.

For example, if no rotational force is applied to the release lever in the state in which the fixture is lowered, the fixture may return upwards to its original position by a spring so that the protrusion portion and the key portion may engage with each other to be prevented from rotating.

For example, a rotating portion may be formed to extend downwards from the pressing portion of the release lever, and the fixture may be pressed by the pressing portion of the release lever to be lowered and rotate by being pressed by the rotating portion in the lowered state.

For example, the release lever may cause the fixture to be supported by the rotating portion in the state in which the fixture is lowered so as to enable rotation of the fixture and the shaft.

For example, if an external force is applied to the shaft in the state in which the protrusion portion is engaged with the key portion, rotation of the fixture may be prevented, thereby preventing rotation of the shaft.

For example, a bent hook may be formed to extend downwards from the release lever, and the housing may be coupled to the release lever by being fitted to the hook.

For example, a fixed rib may protrude downwards from the release lever, and the fixed rib may regulate the height of the fixture above the fixture.

For example, the brake device may further include a support rib supporting a central portion of the fixture at the bottom of the fixture, and the support rib may prevent the central portion of the fixture from being separated laterally.

For example, the key portion and the protrusion portion may have outer surfaces formed in a spherical shape.

For example, the spring may be a coil spring, and upper and lower ends of the coil spring may come into contact by a certain length with a lower surface of the fixture and a bottom surface of the accommodation space of the housing, respectively.

According to the brake device of a recliner for a vehicle seat of the present disclosure, it is possible to enable the rotation of the recliner when a forward input of rotational force is applied to a release lever and prevent the rotation of the recliner when a rotational force is applied to a shaft in the state in which the vehicle seat is fixed, so that the movement of the seatback that is not intended by the user may be restricted, thereby improving driving stability.

Advantageous effects obtainable from the present disclosure may not be limited to the above mentioned effects, and other effects which are not mentioned may be clearly understood, through the following descriptions, by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
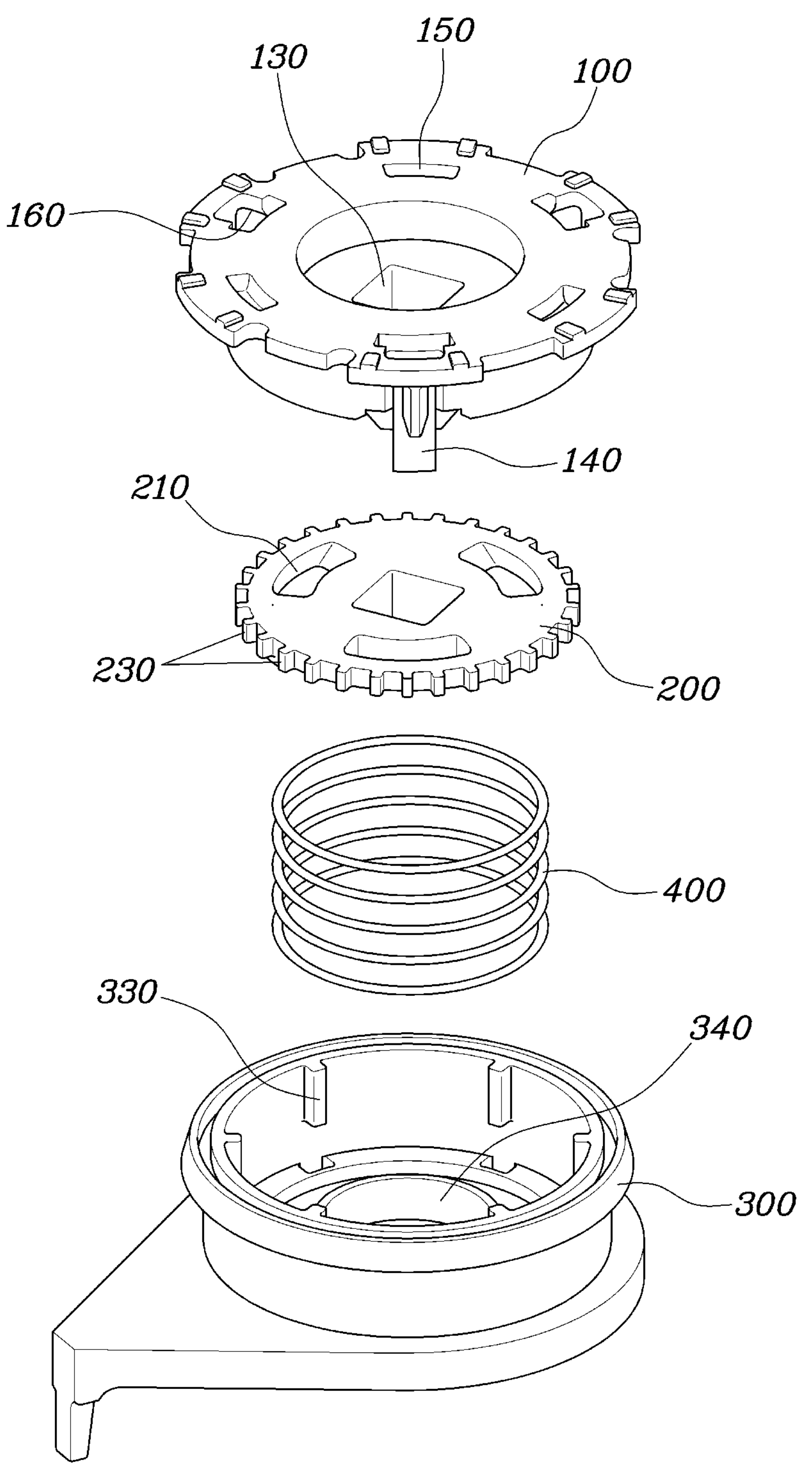
FIG. 1 is a diagram illustrating a brake device of a recliner for a vehicle seat according to an embodiment of the present disclosure.

Hereinafter, embodiments disclosed in the present specification will be described in detail with reference to the accompanying drawings, and the same or similar elements are given the same and similar reference numerals, so duplicate descriptions thereof will be omitted.

The terms “module” and “unit” used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure. Terms including an ordinal number such as “first”, “second”, or the like may be used to describe various elements, but the elements are not limited to the terms. The above terms are used only for the purpose of distinguishing one element from another element.

In the case where an element is referred to as being “connected” or “coupled” to any other element, it should be understood that another element may be provided therebetween, as well as that the element may be directly connected or coupled to the other element. In contrast, in the case where an element is “directly connected” or “directly coupled” to any other element, it should be understood that no other element is present therebetween.

A singular expression may include a plural expression unless they are definitely different in a context.

As used herein, the expression “include” or “have” are intended to specify the existence of mentioned features, numbers, steps, operations, elements, components, or combinations thereof, and should be construed as not precluding the possible existence or addition of one or more other features, numbers, steps, operations, elements, components, or combinations thereof.

FIG. 1 is a diagram illustrating a brake device of a recliner for a vehicle seat according to an embodiment of the present disclosure. FIG. 1 is provided based on the components related to this embodiment, but the actual brake device of a recliner for a vehicle seat may be implemented by including fewer or more components.

Referring to FIG. 1, the brake device of a recliner for a vehicle seat according to an embodiment may include a release lever 100, a fixture 200, a housing 300, and a spring 400.

First, the housing 300 may be formed with a through-hole 340 through which a shaft of the seat recliner passes. Although not shown in the drawing, the shaft is a long member that is inserted where the vehicle seat and the seatback are connected so that the recliner function of the vehicle seat operates to adjust the seatback.

The housing 300 may be provided inside the vehicle recliner and configured in a dense structure with integrated functions by disposing the fixture 200, the spring 400, and the housing 300, which will be described later, in an accommodation space formed on the inside thereof. In addition, the housing 300 has key portions 330 formed inwards to be engaged with the fixture 200. A plurality of key portions 330 may be formed to protrude inwards from the inner circumferential surface of the housing 300 so as to be spaced apart from each other at equal intervals in the circumferential direction. As will be described later, the key portion 330 may be formed to have a predetermined length on the inner surface of the housing 300 and may not be formed in the lower portion thereof such that the protrusion portion 230 is released from the key portion 330 by the release lever 100 when rotational force is applied from the outside.

The fixture 200 is accommodated in the accommodation space of the housing 300 so as to be coupled to the shaft. The fixture 200 is coupled to the shaft through a fixing hole 220 formed in the center of the fixture 200 and is pressed by an inclined portion 141 of the pressing portion 140, which will be described later, through a plurality of inclined holes 210 formed at equal intervals in the circumferential direction based on the center of the fixture 200. The fixing hole 220 of the fixture 200 may be formed to have the same polygonal cross-section as the shaft such that the shaft may pass through the fixing hole 220.

In addition, the spring 400 may serve to support the fixture 200 upwards so that the fixture 200 may return in the upward direction to the original position when the rotational force is not applied to the release lever 100. Protrusion portions 230 may be formed on the outer surface of the fixture 200 so as to be engaged with the key portions 330 of the housing 300. If the protrusion portions 230 and the key portions 330 are engaged with each other while the fixture 200 is supported upwards, rotation of the fixture 200 is prevented, and as the rotation of the fixture 200 is prevented, relative rotation of the shaft is also prevented.

Here, a plurality of protrusion portions 230 may be formed in the fixture 200 and a plurality of key portions 330 may be formed in the housing 300, and even if some of the protrusion portions 230 or key portions 330 are damaged, the remaining protrusion portions 230 and key portions 330 may be engaged with each other to prepare for an emergency situation. In addition, since the number of protrusion portions 230 formed is smaller than the number of key portions 330, it may be easy for the protrusion portion 230 and the key portion 330 to engage with each other by pressing of the release lever 100.

Figure 2:
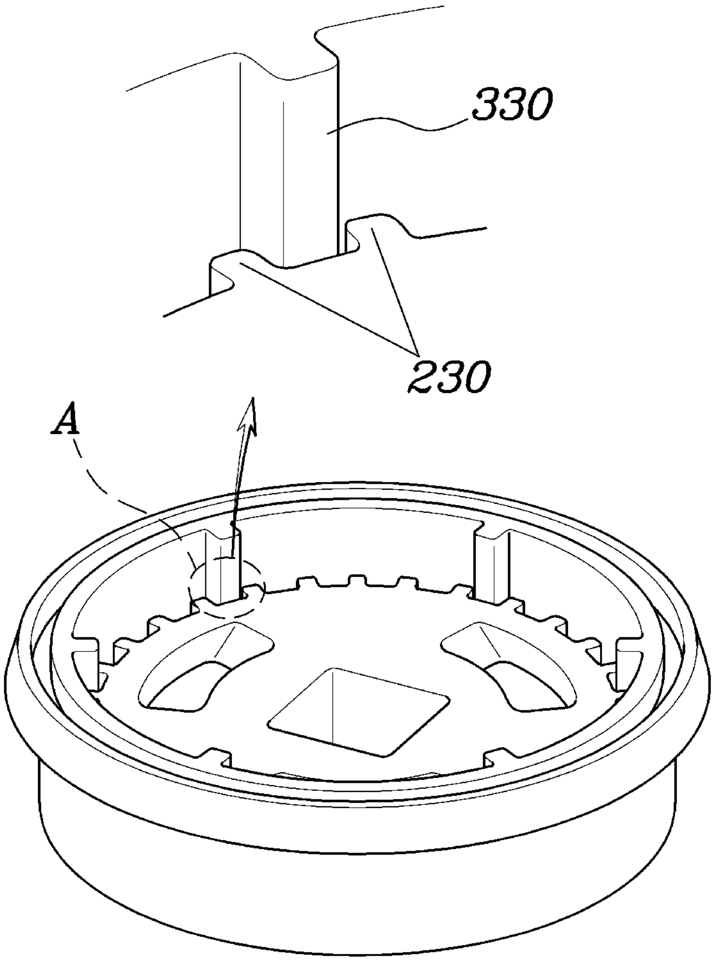
FIG. 2 is a diagram illustrating the shapes of a key portion and a protrusion portion according to an embodiment of the present disclosure.

In addition, the key portion 330 and the protrusion portion 230 may have outer surfaces formed in a spherical shape. FIG. 2 is a diagram illustrating the shapes of a key portion 330 and a protrusion portion 230 according to an embodiment of the present disclosure. Referring to area A in FIG. 2, the key portion 330 and the protrusion portion 230 are engaged with each other to generate locking force to prevent relative rotation of the fixture 200 to the shaft. However, if the two parts are in contact with each other in a vertical direction, the key portion 330 and the protrusion portion 230 are not easily released from each other. Therefore, by applying a spherical shape to the outer surface where the key portion 330 and the protrusion portion 230 come into contact with each other, the contact area may be minimized, enabling easy engagement and release thereof.

In addition, the release lever 100 may be installed above the fixture 200 and press the fixture 200 downwards when rotational force is applied from the outside. If the fixture 200 is pressed downwards, the engagement of the protrusion portion 230 and the key portion 330 is released, enabling the fixture 200 and shaft to rotate. A plurality of first levers 150 and a plurality of second levers 160 may be formed on the release lever 100 so as to be spaced apart from each other in the circumferential direction thereof. The first lever 150 and the second lever 160 may intersect each other to be spaced apart from each other so that a device for applying rotational force from the outside may be further installed on the outer side thereof.

Hereinafter, a process in which the fixture 200 is pressed downwards will be described.

Figure 3:
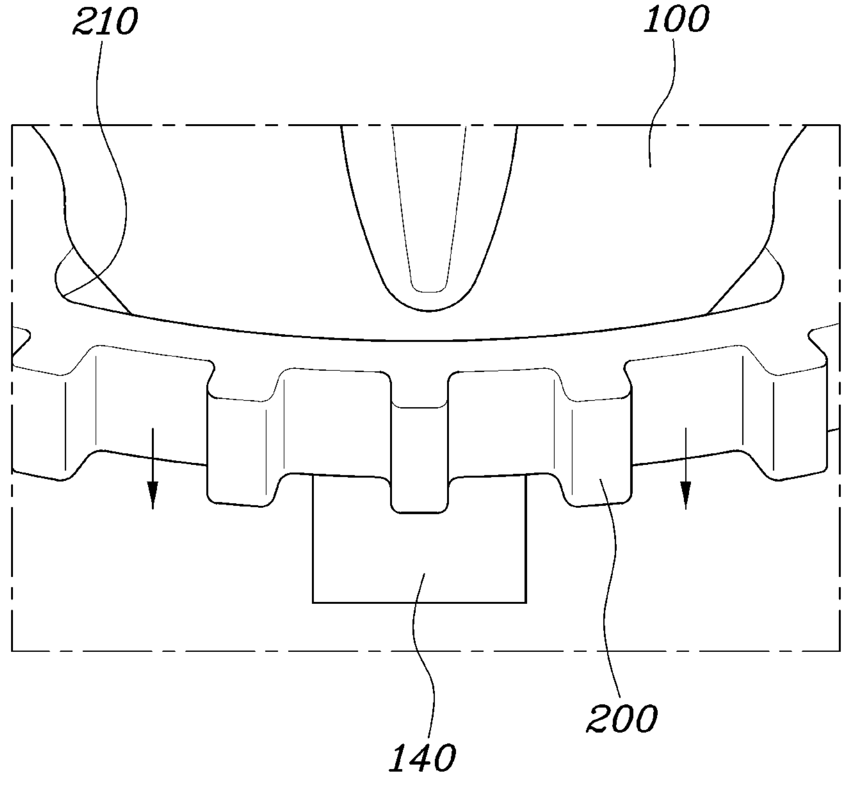
FIG. 3 is a diagram illustrating a state in which a fixture is pressed downwards by rotational force applied to a release lever according to an embodiment of the present disclosure.
Figure 4:
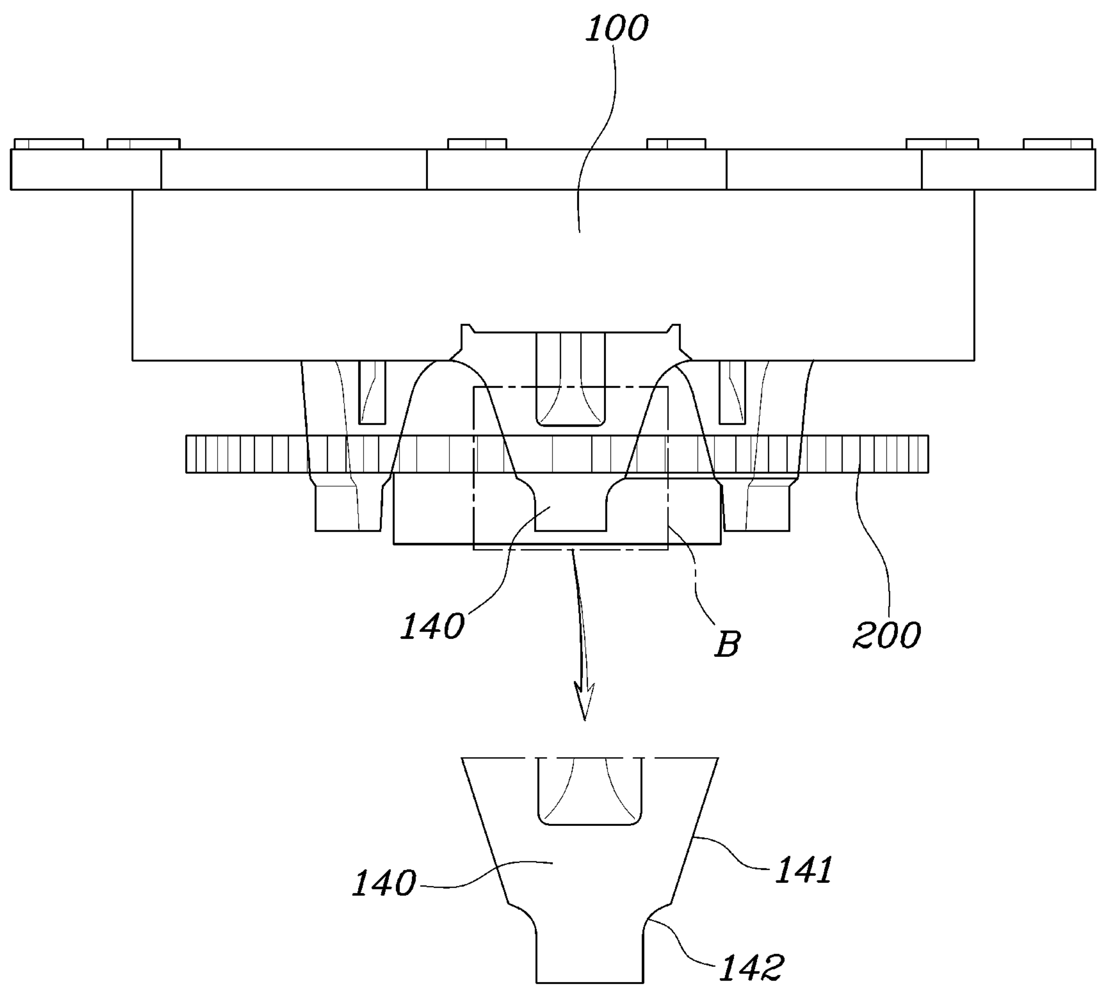
FIG. 4 is a diagram illustrating a pressing portion extending downwards from a release lever according to an embodiment of the present disclosure.

FIG. 3 is a diagram illustrating a state in which a fixture 200 is pressed downwards by rotational force applied to a release lever 100 according to an embodiment of the present disclosure, and FIG. 4 is a diagram illustrating a pressing portion 140 extending downwards from a release lever 100 according to an embodiment of the present disclosure.

Referring to FIG. 3, a pressing portion 140 may be formed to extend downwards from the release lever 100 so that when the release lever 100 rotates, the pressing portion 140 may press the fixture 200 downwards to move down. If a forward input of rotational force is applied from the outside, the fixture 200 may move down by the pressing portion 140 so that the engagement of the key portion 330 and the protrusion portion 230 is released to unlock the housing 300 and the fixture 200, enabling the rotation of the shaft so as to adjust the recliner.

This operation may be performed by an inclined portion 141 and a rotating portion 142 that constitute the pressing portion 140 of the release lever 100. Referring to area B in FIG. 4, it can be seen that an inclined hole 210 is formed in the fixture 200 and that the pressing portion 140 is inserted into the inclined hole 210. If rotational force is applied from the outside of the release lever 100 in the state where the pressing portion 140 is inserted into the inclined hole 210, the fixture 200 descends.

Specifically, the inclined portion 141 may constitute side ends of the pressing portion 140 and may be formed to become narrower in width from top to bottom along the inclined surface. As the pressing portion 140 descends, the inclined portion 141 comes into contact with the inclined hole 210, and accordingly, the side end of the inclined hole 210 is pressed laterally and downwards by the inclined portion 141 so that the fixture 200 may move downwards. Here, the inner surface of the inclined hole 210 and the outer surface of the inclined portion 141 are formed in a spherical shape based on its own center, so that the fixture 200 may ascend or descend smoothly. Afterwards, when the fixture 200 moves downwards to a certain height, the protrusion portion 230 and the key portion 330 are disengaged, and the fixture 200 and shaft are able to rotate.

In addition, in the state where the fixture 200 is lowered by the inclined portion 141, the seatback must be adjustable through the recliner. At this time, the fixture 200 may be rotated by the rotating portion 142 extending downwards from the pressing portion 140. Unlike the inclined portion 141, since the rotating portion 142 does not have an inclined surface, it may press the fixture 200 laterally to support the same. Therefore, the fixture 200 may be rotated without moving downwards.

Figure 5:
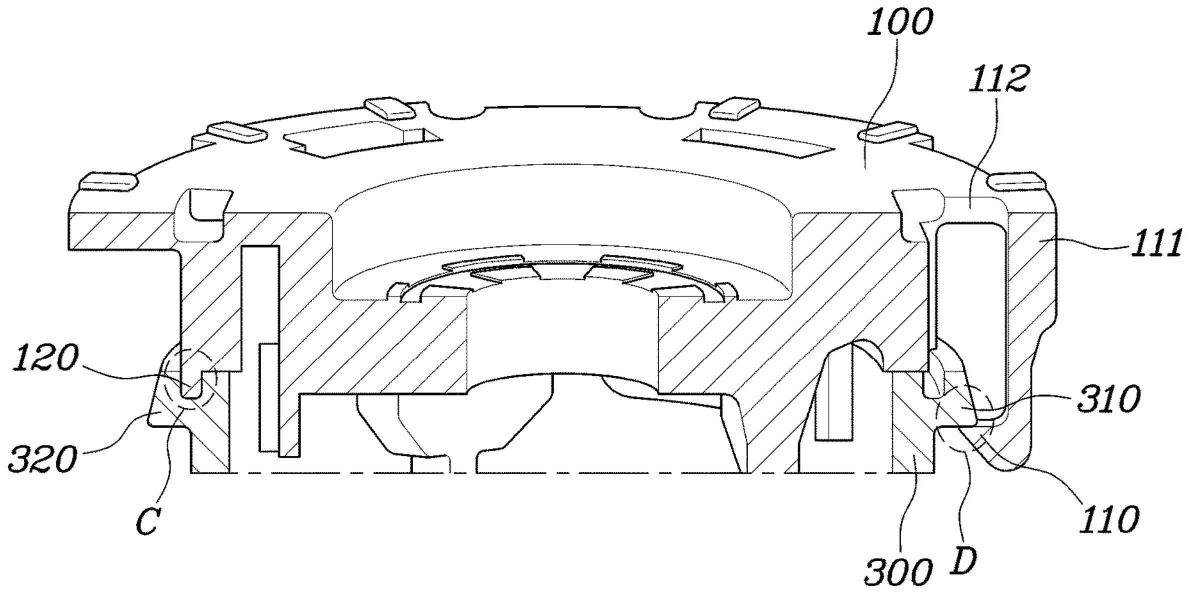
FIG. 5 is a diagram illustrating a state in which a release lever and a housing are coupled to each other according to an embodiment of the present disclosure.

FIG. 5 is a diagram illustrating a state in which a release lever 100 and a housing 300 are coupled to each other according to an embodiment of the present disclosure.

Referring to FIG. 5, the housing 300 may have a flange 310 extending outwards from the top thereof, and a groove may be formed inwards on the flange 310. In addition, the release lever 100 may have a hook 110 and a guide rib 120 formed downwards on the release lever 100 so as to be coupled to the housing 300. As shown in area D, the hook 110 may downwardly extend on the side of the housing 300 to have a bent shape through a downward rib 111 and a lateral rib 112, and as shown in area C, the guide rib 120 may protrude downwards from the release lever 100.

Here, the guide rib 120 of the release lever 100 may be coupled to the groove formed in the flange 310 to push the housing 300 downwards, and the hook 110 may be fitted to the lower surface of the flange 310 to pull the housing 300 upwards. Through this, the housing 300 and the release lever 100 may be firmly coupled to each other, thereby improving the stability of the release lever 100 in the height and radial directions during operation.

Figure 6:
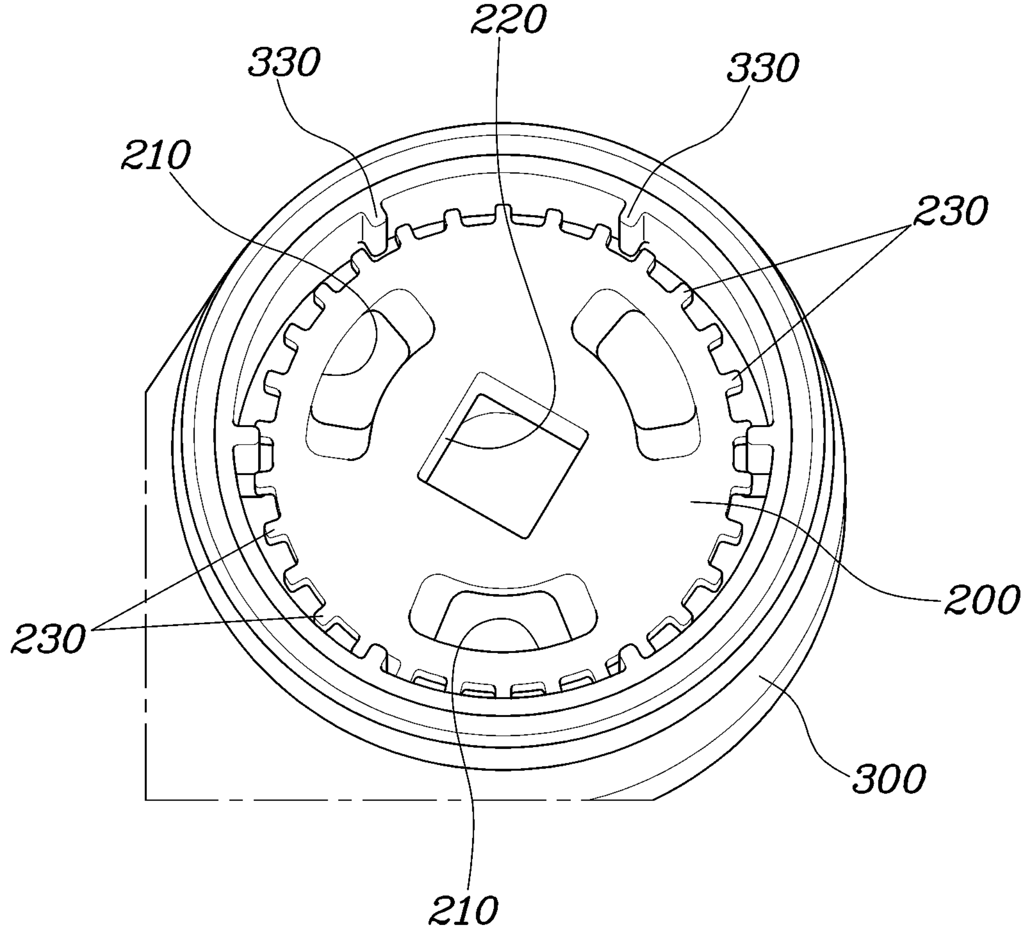
FIG. 6 is a diagram illustrating a state in which a protrusion portion is engaged with a key portion to be prevented from rotating according to an embodiment of the present disclosure.

FIG. 6 is a diagram illustrating a state in which a protrusion portion 230 of a fixture 200 is engaged with a key portion 330 to be prevented from rotating according to an embodiment of the present disclosure.

Referring to FIG. 6, if no rotational force is applied to the release lever 100 in the state in which the fixture 200 is lowered, the fixture 200 may return upwards to its original position so that the protrusion portion 230 and key portion 330 may be engaged to prevent rotation thereof. Contrary to the case where the forward input of rotational force is applied from the outside, if a reverse input of rotational force is applied through the shaft, the fixture 200 and shaft do not rotate while the protrusion portion 230 and the key portion 330 are engaged. To this end, if the rotational force is removed in the state where the fixture 200 is pressed downwards by the release lever 100, only the elastic force of the spring 400 exists, so the elastic force of the spring 400 pushes the fixture 200 upwards. At this time, the inclined hole 210 slides through the pressing portion 140 of the release lever 100, and the fixture 200 moves upwards so that the protrusion portion 230 and the key portion 330 are engaged. Therefore, if an external force is applied to the shaft in the state where the protrusion portion 230 is engaged with the key portion 330, the rotation of the fixture 200 may be prevented, thereby preventing the shaft from rotating. Through this, the brake device of the recliner may improve device durability using the engagement and disengagement of the protrusion portion 230 and the key portion 330 in a situation where external force is reversely input.

Figure 7:
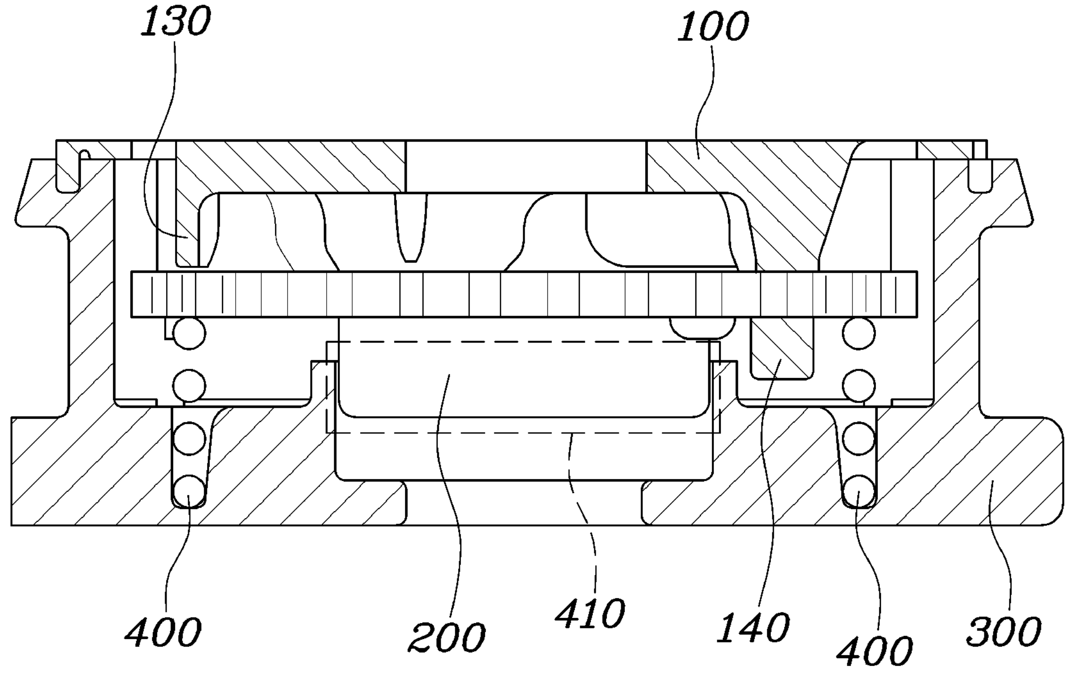
FIG. 7 is a diagram illustrating a fixture whose position is regulated through a fixed rib and a support rib according to an embodiment of the present disclosure.

FIG. 7 is a diagram illustrating a fixture 200 whose position is regulated through a fixed rib 130 and a support rib 410 according to an embodiment of the present disclosure.

Referring to FIG. 7, it can be seen that the fixed rib 130 protrudes downwards from the release lever 100 and that a support rib 410 supports the fixture 200 at the bottom thereof. The fixed rib 130 may be disposed adjacent to the upper part of the fixture 200 so as to be perpendicular to the space between the inclined hole 210 and the protrusion portion 230, based on the center of the fixture 200. The fixed rib 130 may be supported upwards by an upward force caused by the elastic force of the spring 400 so as to regulate the height of the fixture 200, thereby maintaining the degree of engagement between the protrusion portion 230 and the key portion 330 to be constant. In addition, the support rib 410 formed on the lower portion of the fixture 200 may come into contact with the central portion of the fixture 200 to support the fixture 200 at the bottom thereof, thereby preventing the central portion of the fixture 200 from being laterally separated. The support rib 410 may be formed in a cylindrical shape to maintain the center when the fixture 200 ascends and descends, so that the lower end of the support rib 410 may be coupled to the housing 300, thereby improving the operational stability of the brake device.

Figure 8:
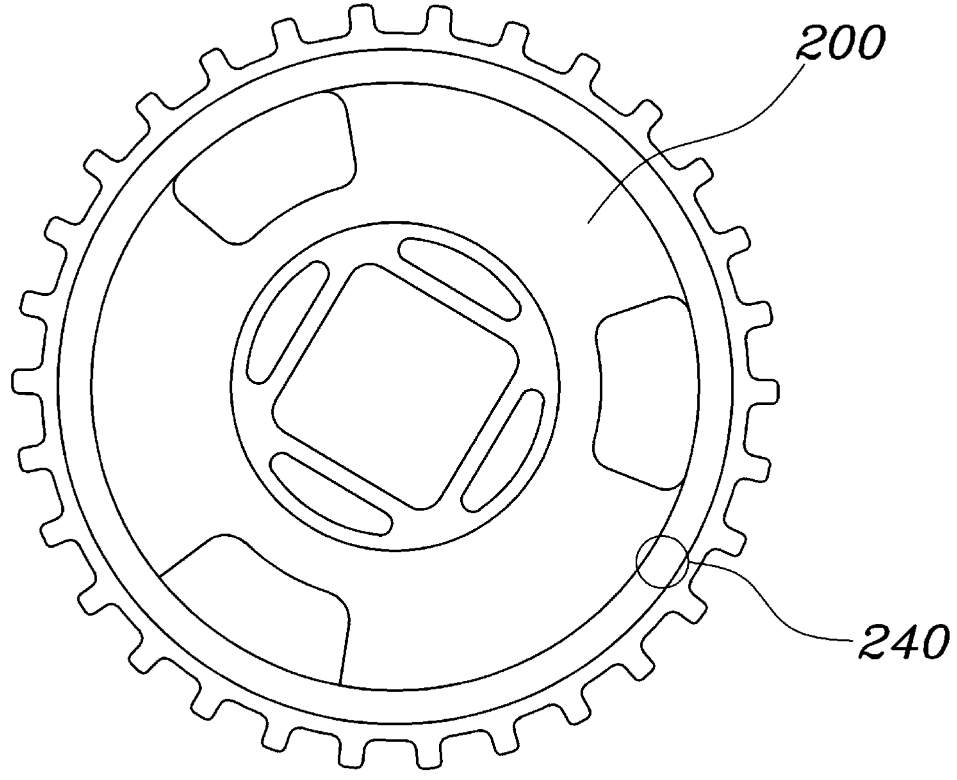
FIG. 8 is a diagram illustrating a fixing groove formed on the lower surface of a fixture according to an embodiment of the present disclosure.

FIG. 8 is a diagram illustrating a fixing groove 240 formed on the lower surface of a fixture 200 according to an embodiment of the present disclosure.

Referring to FIG. 8, the upper end of the coil spring 400 may be seated on the fixing groove 240 formed on the lower surface of the fixture 200, thereby firmly supporting the fixture 200 at the bottom thereof.

The fixing groove 240 may be formed between the protrusion portion 230 and the inclined hole 210, based on the center of the fixture 200, thereby increasing the support stability of the fixture 200 by the coil spring 400.

Figure 9:
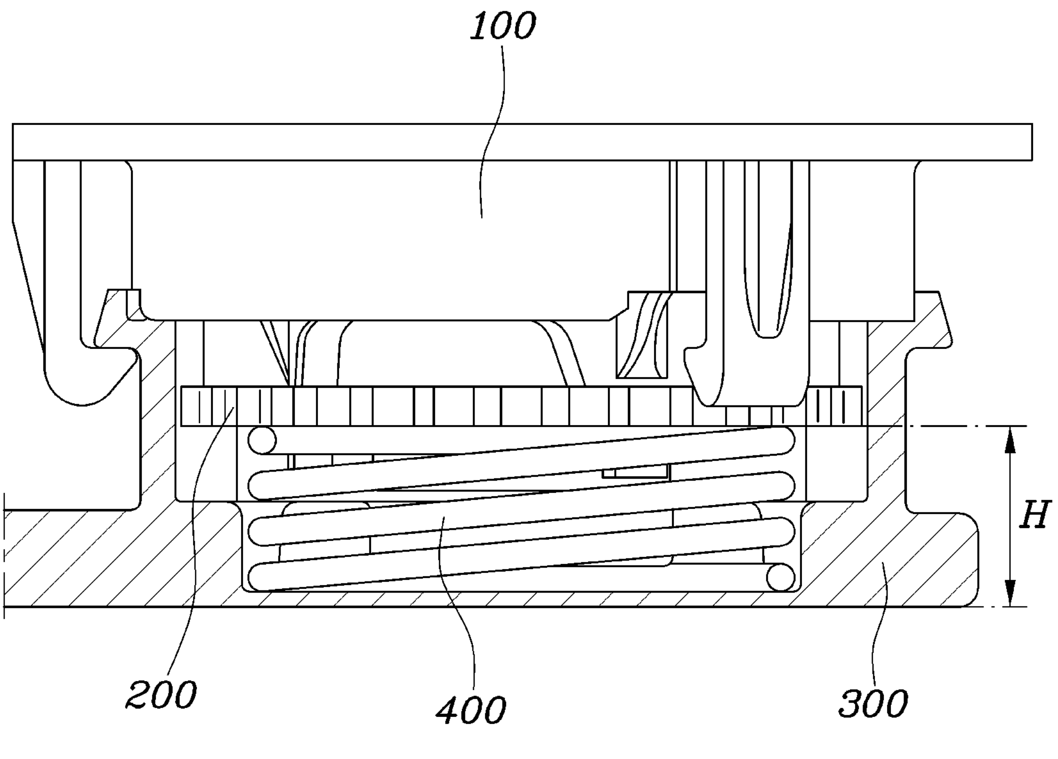
FIG. 9 is a diagram illustrating the height of a spring before external rotational force is applied according to an embodiment of the present disclosure.

FIG. 9 is a diagram illustrating the height of a spring 400 before external rotational force is applied according to an embodiment of the present disclosure.

Referring to FIG. 9, the spring 400 may be configured as a coil spring 400. The fixture 200 may be configured to come into contact with the upper end of the coil spring 400, and the upper end and the lower end of the coil spring 400 may be configured to come into contact by a certain length with the lower surface of the fixture 200 and the bottom surface of the accommodation space of the housing 300, respectively. Through this, the upper and lower ends of the coil spring 400 may come into surface contact with the fixture 200 and housing 300, thereby improving operational stability when the fixture 200 ascends and descends. In addition, it can be seen that the basic position H of the spring 400 in the non-operating state of the brake device is the same as the height H of the spring 400 in the free field state. Through this, it is possible to minimize the operating sound generated during the engagement and release of the protrusion portion 230 and the key portion 330 while the fixture 200 ascends or descends, thereby improving operating quality.

According to the embodiments of the present disclosure described above, it is possible to enable the rotation of the recliner when a forward input of rotational force is applied to a release lever and prevent the rotation of the recliner when a rotational force is applied to a shaft in the state in which the vehicle seat is fixed, so that the movement of the seatback that is not intended by the user may be restricted, thereby improving driving stability.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A brake device of a recliner for a vehicle seat, the brake device comprising:
   - a housing having a through-hole through which a shaft of a seat recliner passes, an accommodation space defined therein, and a key portion defined toward an inside thereof;
   - a fixture disposed in the accommodation space of the housing to be coupled to the shaft, supported upwards by a spring, having a protrusion portion defined on an outer side thereof, and configured to be prevented from rotating by engagement of the protrusion portion and the key portion while being supported upwards; and a release lever disposed above the fixture and configured to press, in case that a rotational force is applied from an outside, the fixture downwards so as to release the engagement of the protrusion portion and the key portion, thereby enabling rotation of the shaft and the fixture, wherein a bent hook is defined to extend downwards from the release lever, and wherein the housing is coupled to the release lever by being fitted to the bent hook.

2. The brake device of claim 1, wherein a plurality of key portions protrude inwards from an inner circumferential surface of the housing and are arranged to be spaced apart from each other in a circumferential direction thereof.

3. The brake device of claim 1, wherein a pressing portion extends downwards from the release lever, and wherein when the release lever rotates, the pressing portion presses the fixture downwards to move the fixture downwards.

4. The brake device of claim 3, wherein a side end of the pressing portion comes into contact with the fixture, wherein an inclined portion is defined on the side end of the pressing portion so as to become narrower in width from top to bottom, and wherein the fixture is pressed by the inclined portion of the pressing portion to move downwards.

5. The brake device of claim 4, wherein an inclined hole is defined in the fixture, wherein the pressing portion is configured to be inserted into the inclined hole, and wherein when the release lever rotates in a state in which the pressing portion is inserted into the inclined hole, the inclined portion of the pressing portion presses a side end of the inclined hole to move the fixture downwards.

6. The brake device of claim 3, wherein the pressing portion presses the fixture downwards such that the protrusion portion is released downwards from the key portion, thereby enabling the rotation of the fixture and the shaft.

7. The brake device of claim 3, wherein in case that no rotational force is applied to the release lever in a state in which the fixture is lowered, the fixture returns upwards to its original position by the spring so that the protrusion portion and the key portion engage with each other to be prevented from rotating.

8. The brake device of claim 3, wherein a rotating portion is defined to extend downwards from the pressing portion of the release lever, and wherein the fixture is pressed by the pressing portion of the release lever to be lowered and rotates by being pressed by the rotating portion in a lowered state.

9. The brake device of claim 8, wherein the release lever is configured to cause the fixture to be supported by the rotating portion in a state in which the fixture is lowered so as to enable the rotation of the fixture and the shaft.

10. The brake device of claim 1, wherein in case that an external force is applied to the shaft in a state in which the protrusion portion is engaged with the key portion, the rotation of the fixture is prevented, thereby preventing the rotation of the shaft.

11. The brake device of claim 1, wherein a fixed rib protrudes downwards from the release lever, and wherein the fixed rib is disposed above the fixture and regulates a height of the fixture.

12. The brake device of claim 1, further comprising a support rib configured to support a central portion of the fixture at a bottom of the fixture, wherein the support rib prevents the central portion of the fixture from being separated laterally.

13. The brake device of claim 1, wherein the spring is a coil spring, and wherein upper and lower ends of the coil spring are configured to come into contact with a lower surface of the fixture and a bottom surface of the accommodation space of the housing, respectively.

* * * * *